C. H. WILLISON.
NUT LOCK.
APPLICATION FILED MAY 12, 1914.
1,127,559.
Patented Feb. 9, 1915.
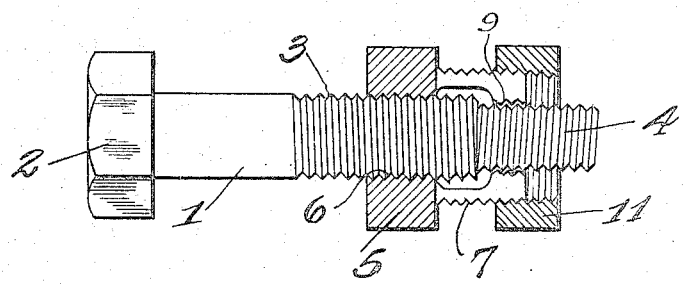
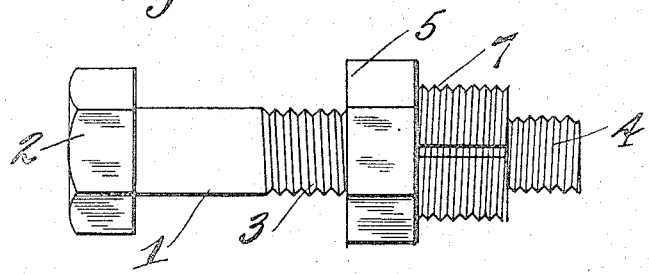
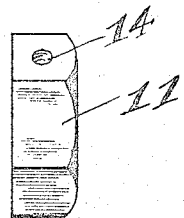
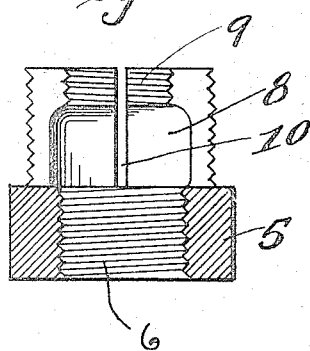
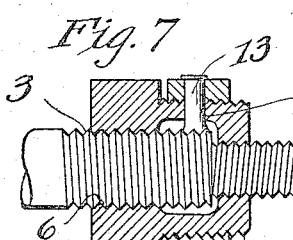
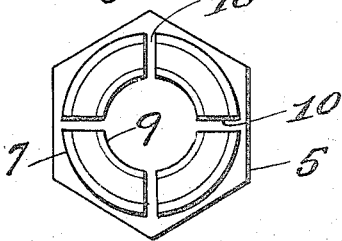
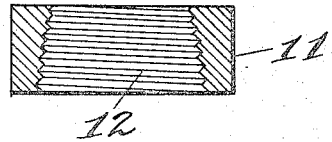
Inventor
C. H. Willison
By Herman A. Phillips
Attorney

UNITED STATES PATENT OFFICE.

CHARLES H. WILLISON, OF ASHLAND, OREGON.

NUT-LOCK.

1,127,559.        Specification of Letters Patent.      Patented Feb. 9, 1915.

Application filed May 12, 1914. Serial No. 838,128.

*To all whom it may concern:*

Be it known that I, CHARLES H. WILLISON, a citizen of the United States of America, residing at Ashland, in the county of Jackson and State of Oregon, have invented certain new and useful Improvements in Nut-Locks, of which the following is a specification.

The present invention relates to improvements in nut locks known as superimposed oppositely threaded locking devices.

The primary object of the invention is the provision of a simple but efficient and durable locking device by means of which a nut may be clamped upon a bolt, so that the nut will be held or locked in position against accidental or unintentional removal therefrom.

The invention consists in certain combinations and arrangements of parts as hereinafter set forth and claimed.

In the accompanying drawing I have illustrated one complete example of the physical embodiment of my invention constructed according to the best mode I have so far devised for the practical application of the principles of the invention.

Figure 1 is a sectional view of a holding nut showing it in place on a bolt constructed according to my invention. Fig. 2 is a view showing the holding nut and bolt in side elevation, the clamping nut being detached. Fig. 3 is a side elevation of the clamping nut detached from Fig. 2. Fig. 4 is a sectional view of the holding nut. Fig. 5 is an end view of the holding nut. Fig. 6 is a sectional view of the clamping nut. Fig. 7 is a fragmentary sectional view showing the clamping nut screwed home, and a locking key applied to the device.

In the preferred embodiment of the invention I employ a bolt 1 provided with the usual head 2, and in this instance the bolt is threaded at 3, and has a reduced end 4 which is also threaded. It will be noted that the threads 3 of large diameter are right hand threads, and the threads 4 on the reduced end of the bolt are left hand threads.

The holding nut 5 is threaded on its interior at 6 so that it will screw upon the threads 3 of the bolt 1, and this holding nut is provided with an extension or sleeve 7, which is provided with exterior threads. The bore 8 of this sleeve is larger in diameter than the threaded portion 6 of the nut 5, so that the sleeve has no engagement whatever with the threads 3 on the bolt 1. At the end of the sleeve 7, however, and upon its interior, I preferably form the interior threads 9 (see Fig. 4), and these threads 9 are adapted to mesh with the threads 4 on the reduced end of the bolt 1.

As clearly seen in the drawings, the sleeve 7 is provided with a series of slots as 10, which extend outwardly from the nut 5 and are open through the end of the extension 7. The general outline of this sleeve 7 is cylindrical, but the presence of the slots 10 in the sleeve admit of a compression of the parts of the sleeve so that it may be forced into a tapered form, and clamped upon the reduced end 4 of the bolt 1. This compression of the slotted sleeve is accomplished by means of the clamping nut 11, which is formed with a tapered threaded bore 12. Thus, the sleeve which is made elastic or resilient by the presence of the slots 10 therein, may be compressed by the action of the clamping nut 11.

In use, after the bolt 1 has been secured in the object or article in connection with which it is to be used, the holding nut 5 is screwed home upon the threads 3, it being understood that the threads 9 of the sleeve are not engaged with the portion 4 at this time. The clamping nut 11 is now threaded upon the end of the extension or sleeve 7, and this nut is then secured as far upon the sleeve as it is possible to turn it. The tapered formation of the threaded bore 12 of the nut 11 causes the segments of the sleeve 7 between the slots 10, to be inwardly bent so that the threads 9 will engage the threads on the reduced end 4 of the bolt 1. By this means the nut 5 is locked against reverse movement, because of the fact that the threaded part 9 is engaging with the oppositely threaded portion 4 of the bolt, and in this manner the nut 5 has both a right hand and a left hand threaded connection with the bolt, and it will therefore be seen that it is impossible for the nut 5 to be removed until the clamping nut 11 has been removed. The clamping nut 11 is held on the sleeve 7 by the resiliency or elasticity of the sleeve as before described.

If desired, a locking key 13 may be employed, to lock the clamping nut to the holding nut, and for this purpose the clamping nut 11 is perforated at 14, and the extension of the holding nut 5 is perforated at 15. When the nut 11 is screwed home, as shown in Fig. 7, and the two perforations 14 and 15 are in register, the key 13 may be driven through the perforations until its end impinges against the threads on the bolt 1, and the end of the key being spread slightly by contact with the threads, the withdrawal of the key is prevented, and turning of the nut 5 is absolutely impossible.

Having thus fully described my invention, what I claim as new and desire to secure by Letters Patent, is:—

1. The combination with a bolt having right hand threads thereon, and a reduced end with left hand threads thereon, of a holding nut threaded on the right hand threads and provided with a compressible sleeve threaded to engage the reduced left hand threaded portion of the bolt but normally disengaged therefrom, and means for compressing the sleeve upon the bolt.

2. The combination with a bolt having right hand threads thereon, and a reduced end with left hand threads thereon, of a holding nut threaded on the right hand threads and provided with a compressible sleeve threaded to engage the reduced left hand threaded portion of the bolt but normally disengaged therefrom, and a clamping nut having a tapered bore adapted to compress said sleeve upon the reduced end of the bolt.

3. The combination with a bolt having right hand threads thereon and a reduced end with left hand threads thereon, of a holding nut threaded on the right hand threads and provided with a compressible sleeve threaded to engage the reduced left hand threaded portion of the bolt but normally disengaged therefrom, a perforated clamping nut having a tapered bore to compress said sleeve upon the reduced end of the bolt, and a locking key passed through said perforated nut and perforated sleeve.

In testimony whereof I affix my signature in presence of two witnesses.

CHARLES H. WILLISON.

Witnesses:
A. J. McCallen,
W. A. Schwimley.